(12) United States Patent
Sfarti

(10) Patent No.: US 7,280,108 B2
(45) Date of Patent: *Oct. 9, 2007

(54) BICUBIC SURFACE RENDERING

(76) Inventor: Adrian Sfarti, 20035 Northwind Sq., Cupertino, CA (US) 95014

( * ) Notice: Subject to any disclaimer, the term of this patent is extended or adjusted under 35 U.S.C. 154(b) by 415 days.

This patent is subject to a terminal disclaimer.

(21) Appl. No.: 10/959,474

(22) Filed: Oct. 5, 2004

(65) Prior Publication Data

US 2005/0057568 A1    Mar. 17, 2005

Related U.S. Application Data

(63) Continuation-in-part of application No. 10/436,698, filed on May 12, 2003, now abandoned, which is a continuation-in-part of application No. 09/734,438, filed on Dec. 11, 2000, now Pat. No. 6,563,501.

(51) Int. Cl.
    *G06T 17/20*    (2006.01)

(52) U.S. Cl. .................................................. 345/423
(58) Field of Classification Search ............... 345/426, 345/442, 423
See application file for complete search history.

(56) References Cited

U.S. PATENT DOCUMENTS 5,261,029 A * 11/1993 Abi-Ezzi et al. ............ 345/423

(Continued)

OTHER PUBLICATIONS

Jeffrey M. Lane, Loren C. Carpenter, Turner Whitted, James F. Blinn, "Scan Line Methods for Displaying Parametrically Defined Surfaces," Jan. 1980, Communications of the ACM, vol. 23, No. 1, p. 23-34.*

(Continued)

*Primary Examiner*—Ulka Chauhan
*Assistant Examiner*—Jason M Repko
(74) *Attorney, Agent, or Firm*—Strategic Patent Group, P.C.

(57) ABSTRACT

A method and system for rendering bicubic surfaces whereby at least a portion of the bicubic surfaces are defined by sixteen control points and bounded by four boundary curves, and each boundary curve is formed by boundary box of line segments formed between four of the control points. The method and system of include transforming only the control points of the surface given a view of the object, rather than points across the entire bicubic surface. Next, a pair of orthogonal boundary curves to process is selected. After the boundary curves have been selected, each of the curves is iteratively subdivided, wherein two new curves are generated with each subdivision. The subdivision of each of the curves is terminated when the curves satisfy a flatness threshold expressed in screen coordinates, whereby the number of computations required to render the object is minimized.

50 Claims, 11 Drawing Sheets

U.S. PATENT DOCUMENTS

| | | | | |
|---|---|---|---|---|
| 5,377,320 | A | * | 12/1994 | Abi-Ezzi et al. ............. 345/502 |
| 5,428,718 | A | * | 6/1995 | Peterson et al. ............ 345/423 |
| 5,488,684 | A | * | 1/1996 | Gharachorloo et al. ..... 345/423 |
| 5,771,341 | A | | 6/1998 | Huddy ....................... 345/419 |
| 5,903,273 | A | * | 5/1999 | Mochizuki et al. ......... 345/423 |
| 6,100,894 | A | | 8/2000 | Goel .......................... 345/423 |
| 6,256,038 | B1 | * | 7/2001 | Krishnamurthy ............ 345/419 |
| 6,437,795 | B1 | | 8/2002 | Brown ....................... 345/581 |
| 6,563,501 | B2 | * | 5/2003 | Sfarti ......................... 345/442 |
| 2004/0227755 | A1 | | 11/2004 | Sfarti |
| 2006/0125824 | A1 | | 6/2006 | Sfarti |

OTHER PUBLICATIONS

Alyn Rockwood, Kurt Heaton, Tom Davis, "Real-Time Rendering Of Trimmed Surfaces," Jul. 1989, ACM SIGGRAPH Computer Graphics, vol. 23 No. 3, p. 107-116.*

Fuhua Cheng, "Estimating Subdivision Depths for Rational Curves and Surfaces," Apr. 1992, ACM Transactions on Graphics, vol. 11, No. 2, p. 140-151.*

Foley, James et al., "Computer Graphics: Principles and Practice," 2d Edition, Addison-Wesley Publishing Company, 1990, pp. 511-527.

* cited by examiner

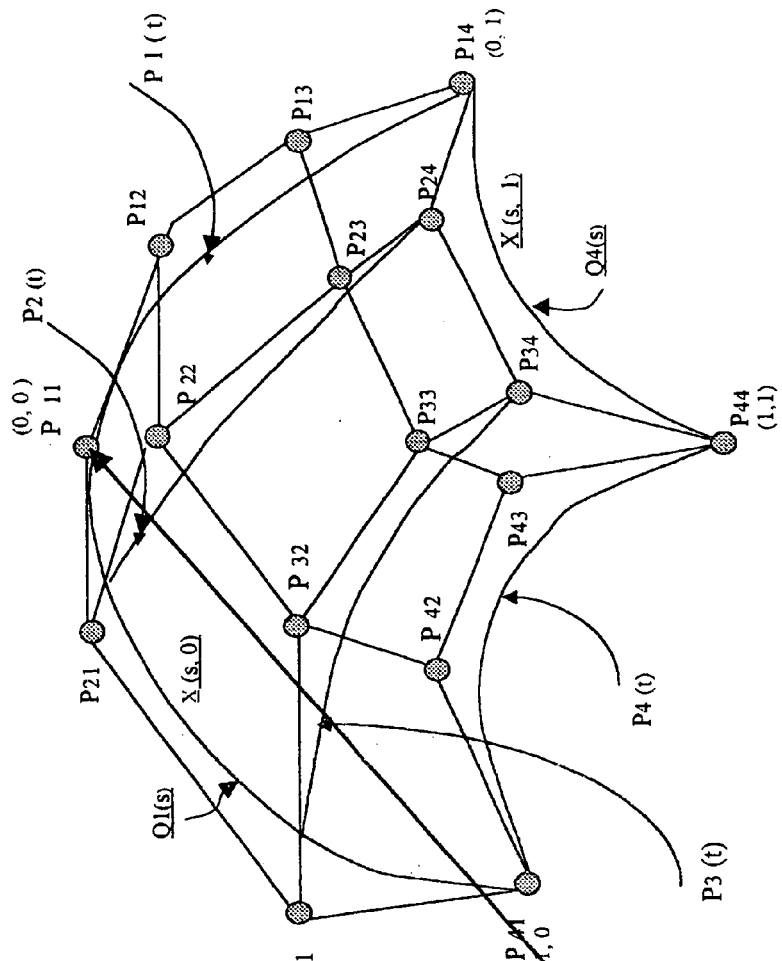
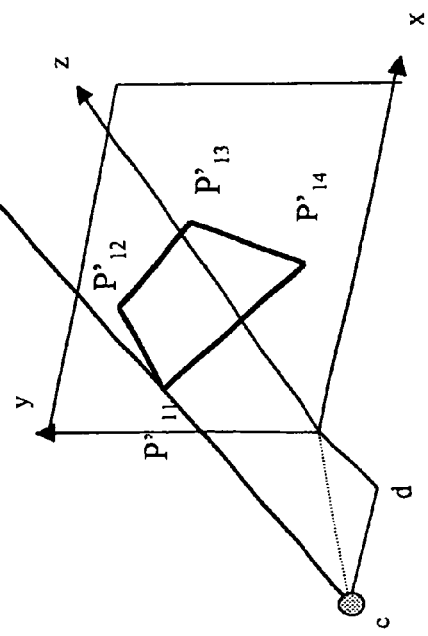
Figure 9

BICUBIC SURFACE RENDERING

CROSS-REFERENCE TO RELATED APPLICATIONS

The present invention is a continuation-in-part of U.S. application Ser. No. 10/436,698 entitled "Bicubic Surface Rendering", filed on May 12, 2003, now abandoned, which is a continuation-in-part of U.S. application Ser. No. 09/734,438, now U.S. Pat. No. 6,563,501 entitled "Bicubic Surface Rendering," issued May 13, 2003, is herein incorporated by reference.

FIELD OF THE INVENTION

The present invention relates to computer graphics and more specifically to a method and apparatus for rendering a bicubic surface on a computer system.

BACKGROUND OF THE INVENTION

Object models are often stored in computer systems in the form of surfaces. The process of displaying the object (corresponding to the object model) generally requires rendering, which usually refers to mapping the object model onto a two dimensional surface. At least when the surfaces are curved, the surfaces are generally subdivided or decomposed into triangles in the process of rendering the images. In order to animate objects made of surfaces one applies special linear transformations to the vertices of the resulting triangles and to the normals to the surface at the triangle vertices. A special class of surfaces is "deformable" surfaces, that is surfaces that are plastic or elastic. Such surfaces can be decomposed into triangles but the decomposition as well as the normal calculation must happen in real time since the surface varies in time. The current state of the art is capable of triangulating surfaces and calculating normals one time, off-line, not in real time by employing tools called "off-line tesselators". In order to animate a deformable surface the current state of the art attempts to deform the resulting triangles and subjects both the triangles' vertices and the normals to some very complicated transformations that take into account the motion of the surface as well as its deformation.

Deformable surfaces are bounded by cubic parametric curves. A cubic parametric curve is defined by the positions and tangents at the curve's end points. A Bezier curve, for example, is defined by a geometry matrix of four points (P1-P4) that are defined by the intersections of the tangent vectors at the end points of the curve. Changing the locations of the points changes the shape of the curve.

Cubic curves may be generalized to bicubic surfaces by defining cubic equations of two parameters, s and t. In other words, bicubic surfaces are defined as parametric surfaces where the (x,y,z) coordinates in a space called "world coordinates" (WC) of each point of the surface are functions of s and t. Varying both parameters from 0 to 1 defines all points on a surface patch. If one parameter is assigned a constant value in the other parameters vary from 0 to 1, the result is a cubic curve, defined by a geometry matrix P comprising 16 control points (FIG. 4).

While the parameters s and t describe a closed unidimensional interval (typically the interval [0,1]) the points (x,y,z) describe the surface:

x=f(s,t), y=g(s,t), z=h(s,t) s □ [0,1], t □[0,1], where □ represents an interval between the two coordinates in the parenthesis.

The space determined by s and t, the bidimensional interval [0,1]×[0,1] is called "parameter coordinates" (PC). Textures described in a space called "texture coordinates" (TC) that can be two or even three dimensional are described by sets of points of two ((u,v)) or three coordinates ((u,v,q)). The process of attaching a texture to a surface is called "texture—object association" and consists of associating u, v and q with the parameters s and t via some function:

$$u=a(s,t) v=b(s,t) (\text{and } q=c(s,t))$$

Textures can be used in order to apply both color to the objects and also to make the surfaces of the objects to appear rough. In the latter case, when the textures perturb the points on the surface they are called "displacement maps" and when the textures are used to perturb the orientation of the normals to the surface they are called "bump maps". We will show how the present invention applies to both displacement and bump maps.

FIGS. 1A and 1B are diagrams illustrating a process for rendering bicubic surfaces. As shown in FIG. 1A, the principle used for rendering such a curved surface 10 is to subdivide it into smaller four sided surfaces or tiles 12 by subdividing the intervals that define the parameters s and t. The subdivision continues until the surfaces resulting from subdivision have a curvature, measured in WC space, which is below a predetermined threshold. The subdivision of the intervals defining s and t produces a set of numbers $\{s_i\}$ i=1, n and $\{t_j\}$ j=1, m that determine a subdivision of the PC. This subdivision induces a subdivision of the TC, for each pair $(s_i,t_j)$ we obtain a pair $(u_{i,j}, v_{i,j})$ (or a triplet $(u_{i,j}, v_{i,j}, q_{i,j})$). Here $u_{i,j}=a(s_i,t_j)$, $v_{i,j}=b(s_i,t_j)$, $q_{i,j}=c(s_i,t_j)$. For each pair $(s_i,t_j)$ we also obtain a point (called "vertex") in WC, $V_{i,j}$ $(x(s_i,t_j), y(s_i,t_j), z(s_i,t_j))$.

The contents of a texture map at location $(u_{i,j}, v_{i,j})$ are color and transparency.

The contents of a bump map at a location $(m_{i,j}=m(s_i,t_j), n_{i,j}=n(s_i,t_j))$ are the components of a three dimensional vector $dN_{i,j}$ used for perturbing the normal $N_{i,j}$ to the point $V_{i,j}$ $(x(s_i,t_j), y(s_i,t_j), z(s_i,t_j))$: $N'_{i,j}=N_{i,j}+dN_{i,j}$.

The contents of a displacement map at a location $(k_{i,j}=k(s_i,t_j), l_{i,j}=l(s_i,t_j))$ are the components of a three dimensional point $(dx_{i,j}, dy_{i,j}, dz_{i,j})$ used for perturbing the coordinates of the the point $V_{i,j}$ $(x(s_i,t_j), y(s_i,t_j), z(s_i,t_j))$:

$$V'_{i,j}(x(s_i,t_j), y(s_i,t_j), z(s_i,t_j))=V_{i,j}(x(s_i,t_j), y(s_i,t_j), z(s_i,t_j))+(dx_{i,j}, dy_{i,j}, dz_{i,j})*N_{i,j}$$

This process is executed off-line because the subdivision of the surfaces and the measurement of the resulting curvature are very time consuming. As shown in FIG. 1B when all resulting four sided surfaces (tiles) 12 is below a certain curvature threshold, each such resultant four-sided surface 12 is then divided into two triangles 14 (because they are easily rendered by dedicated hardware) and each triangle surface gets the normal to its surface calculated and each triangle vertex also gets its normal calculated. The normals are used later on for lighting calculations.

As shown in FIG. 2, bicubic surfaces 10A and 10B that share boundaries must share the same subdivision along the common boundary (i.e., the tile 12 boundaries match). This is due to the fact that the triangles resulting from subdivision must share the same vertices along the common surface boundary, otherwise cracks will appear between them.

The conventional process for subdividing a set of bicubic surfaces in pseudocode is as follows:

```
Step 1.
    For each bicubic surface
        Subdivide the s interval
        Subdivide the t interval
    Until each resultant four sided surface is below a certain predetermined
    curvature range
Step 2
    For all bicubic surfaces sharing a same parameter (either s or t)
    boundary
        Choose as the common subdivision the reunion of the
        subdivisions in order to prevent cracks showing along the
        common boundary
Step 3
    For each bicubic surface
        For each pair (si,tj)
            Calculate (ui,j v,j qi,j Vi,j)
            Generate triangles by connecting neighboring vertices
Step 4
        For each vertex Vi,j
            Calculate the normal Ni,j to that vertex
        For each triangle
            Calculate the normal to the triangle
```

The steps 1 through 4 are executed on general purpose computers and may take up to several hours to execute. The steps of rendering the set of bicubic surfaces that have been decomposed into triangles are as follows:

```
Step 5.
    Transform the verices Vi,j and the normals Ni,j
    Transform the normals to the triangles
Step 6.
    For each vertex Vi,j
        Calculate lighting
Step 7
    For each triangle
        Clip against the viewing viewport
        Calculate lighting for the vertices produced by clipping
Step 8
    Project all the vertices Vi,j into screen coordinates (SC)
Step 9
    Render all the triangles produced after clipping and projection
```

Steps 5 through 9 are typically executed in real time with the assistance of specialized hardware found in 3D graphics controllers.

The conventional process for rendering bicubic surfaces has several disadvantages. For example, the process is slow because the subdivision is so computationally intensive, and is therefore often executed off-line. In addition, as the subdivision of the tiles into triangles is done off-line, the partition is fixed, it may not account for the fact that more triangles are needed when the surface is closer to the viewer versus fewer triangles being needed when the surface is farther away. The process of adaptively subdividing a surface as a function of distance is called "automatic level of detail".

Furthermore, each vertex or triangle plane normal needs to be transformed when the surface is transformed in response to a change of view of the surface, a computationally intensive process that may need dedicated hardware. Also, there is no accounting for the fact that the surfaces are actually rendered in a space called "screen coordinates" (SC) after a process called "projection" which distorts such surfaces to the point where we need to take into consideration the curvature in SC, not in WC.

Because the steps required for surface subdivision are so slow and limited, a method is needed for rendering a curved surface that minimizes the number of required computations, such that the images can potentially be rendered in real-time (as opposed to off-line). The present invention addresses such a need.

SUMMARY OF THE INVENTION

The present invention provides a method and system for rendering bicubic surfaces of an object on a computer system. At least portion of the bicubic surfaces are defined by sixteen control points and bounded by four boundary curves, and each boundary curve is formed by boundary box of line segments formed between four of the control points. The method and system of include transforming only the control points of the surface given a view of the object, rather than points across the entire bicubic surface. Next, a pair of orthogonal boundary curves to process is selected. After the boundary curves have been selected, each of the curves is iteratively subdivided, wherein two new curves are generated with each subdivision. The subdivision of each of the curves is terminated when the curves satisfy a flatness threshold expressed in screen coordinates, whereby the number of computations required to render the object is minimized.

According to the system and method disclosed herein, the number of computations required for rendering of an object model is minimized by requiring that only two orthogonal curves of the surface be subdivided. As the number of computations is decreased, the entire rendering process can potentially be performed in real time. According to another aspect of the present invention, the computations for subdivision are performed by expressing the criteria of terminating the subdivision in the screen coordinates (SC). As the curvature is estimated based on how flat it appears to be in SC (pixels), rather than how curved it is in WC, the number of computations required may further be minimized. As a result, the possibility of rendering images in real time is further enhanced. In addition, allowing the curvature to be measured in SC units also allows for accommodating the distance to the viewer, thus giving the process an "automatic level of detail" capability.

BRIEF DESCRIPTION OF THE DRAWINGS

The present invention will be described with reference to the accompanying drawings, wherein:

FIG. 9 is a diagram illustrating the criteria for termination of decomposition in an embodiment of the present invention;

DETAILED DESCRIPTION OF THE PREFERRED EMBODIMENTS

The present invention is directed to a method and apparatus for minimizing the number of computations required for the subdivision of bicubic surfaces into triangles. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

According to the present invention, the reduction in computations is attained by reducing the subdivision to the subdivision on only two orthogonal curves. In addition, the criteria for sub-division may be determined in SC. The description is provided with reference to Bezier surfaces for illustration. Due to such features, the present invention may enable objects to be subdivided and rendered in real-time. The partition into triangles may also be adapted to the distance between the surface and the viewer resulting in an optimal number of triangles. As a result, the effect of automatic level of detail may be obtained, whereby the number of resulting triangles is inversely proportional with the distance between the surface and the viewer. The normals to the resulting tiles are also generated in real time by using the cross product of the vectors that form the edges of the tiles. The texture coordinates associated with the vertices of the resulting triangles are computed in real time by evaluating the functions: u=a(s,t) v=b(s,t). The whole process is directly influenced by the distance between viewer and object, the SC space plays a major role in the computations.

The present invention is described below in further detail with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

Figure 3:
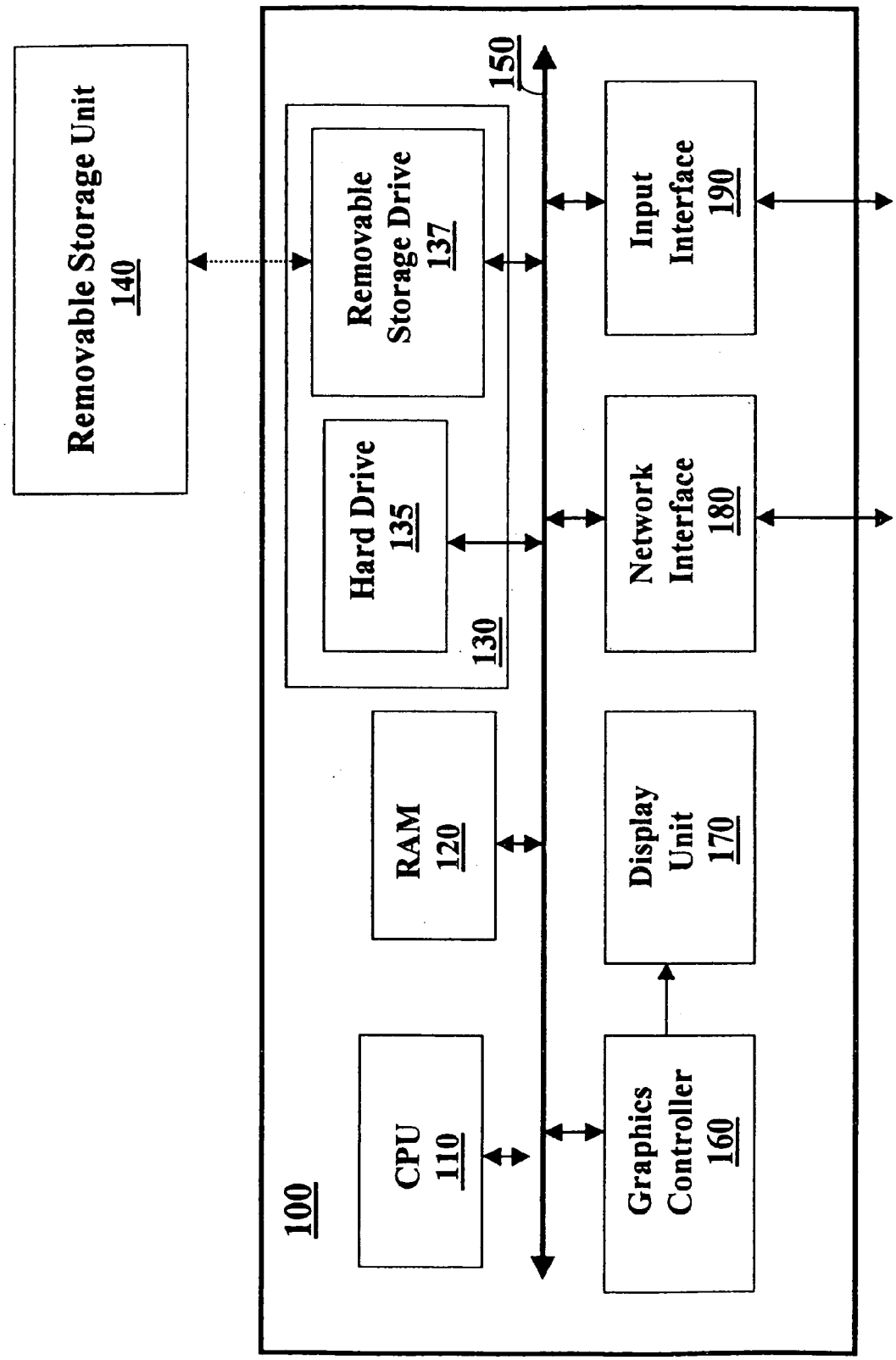
FIG. 3 is a block diagram of a computer system illustrating the details of an embodiment in which the present invention can be implemented.

FIG. 3 is a block diagram of computer system 100 illustrating an example embodiment in which the present invention can be implemented. Computer system 100 may be implemented for example, as a stand-alone computer which displays different images or as a server which renders the images for display on another system connected by the Internet. Even though computer system 100 is described with specific components and architecture for illustration, it should be understood that the present invention may be implemented in several other types of embodiments. For example, the invention can be implemented on multiple cooperating networked computer systems. In addition, each component can be implemented as a combination of one or more of hardware, software and firmware.

Figure 8:
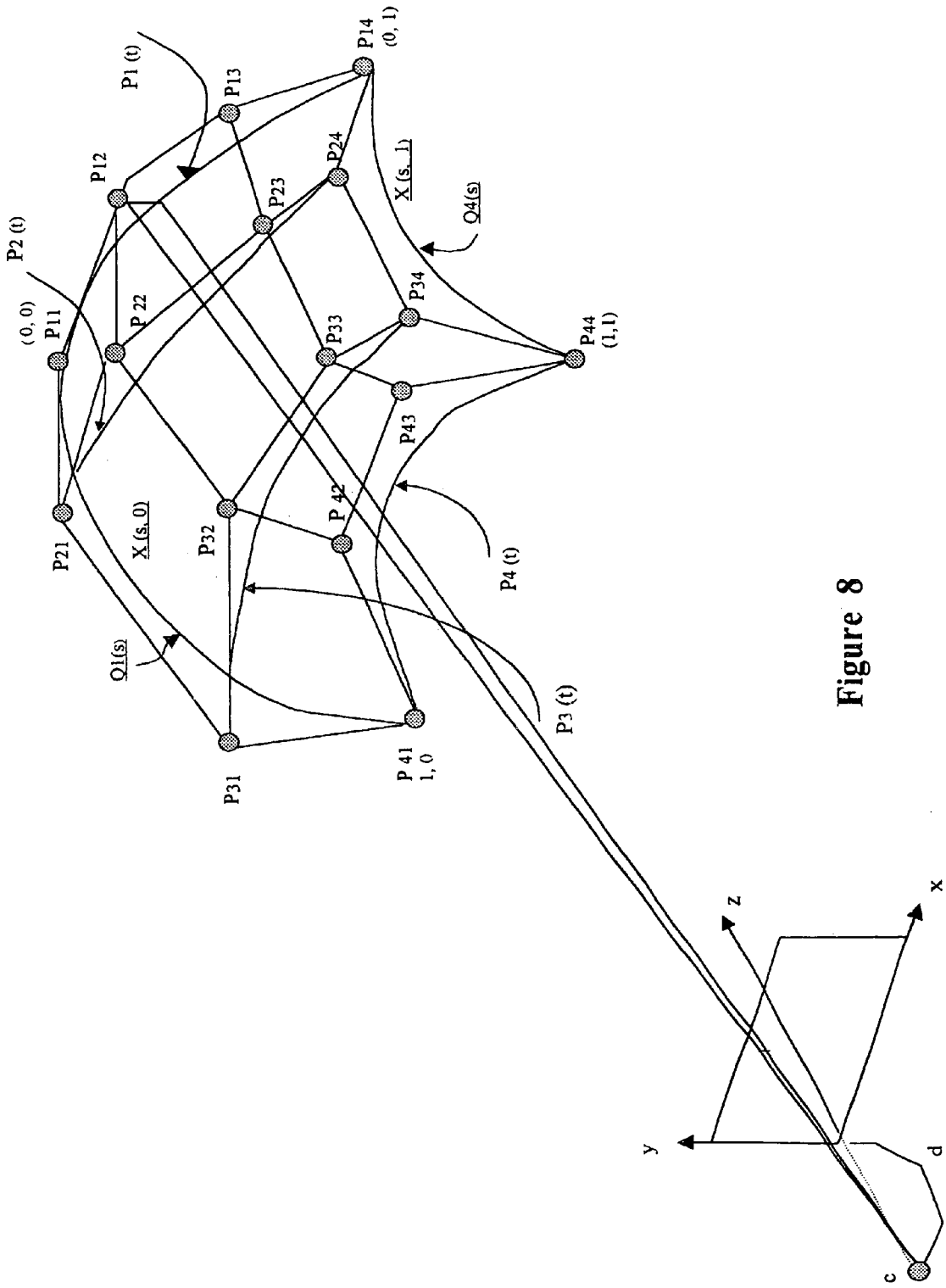
FIG. 8 is diagram illustrating an implementation in accordance with the present invention.

Computer system 100 may contain one or more processors such as central processing unit (CPU) 110, random access memory (RAM) 120, secondary storage 130, graphics controller 160, display unit 170, network interface 180, and input interface 190. All the components except display unit 170 may communicate with each other over communication path 150, which may contain several buses as is well known in the relevant arts. The components of FIG. 8 are described below in further detail.

CPU 110 may execute instructions stored in RAM 120 to provide several features of the present invention. RAM 120 may retrieve such instructions from secondary storage 130 using communication path 150. In the alternative, the instructions may be retrieved on network interface 180 from an external server provided, for example, by an application service provider (ASP) or by another division within a same organization. Network interface 180 may be implemented using Internet protocol (IP). Network interface 180 may also provide communication with a client system (not shown) during the target application development process.

Graphics controller 160 may receive commands and data on communication path 150 from CPU 110, and generates display signals (e.g., in RGB format) to display unit 170. The display signals are generated according to the commands and data received on communication path 150. Display unit 170 contains a display screen to display the images defined by the display signals. Input interface 190 may correspond to a key-board and/or mouse, and generally enables a user to provide inputs. CPU 110, RAM 120, graphics controller 160, display unit 170, network interface 180, and input interface 190 may be implemented in a known way.

Secondary memory 130 may contain hard drive 135 and removable storage drive 137. Hard drive 135 may store the software instructions and data, which enable computer system 100 to provide several features in accordance with the present invention. Hard drive 135 may also store data representing curved surfaces of different objects. In the alternative, some or all of the data and instructions may be provided on removable storage unit 140, and the data and instructions may be read and provided by removable storage drive 137 to CPU 110. Floppy drive, magnetic tape drive, CD-ROM drive, DVD Drive, removable memory chip (PC-MCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer usable storage medium having stored therein computer software and/or data. An embodiment of the present invention is implemented using software running (that is, executing) in computer system 100. In this document, the term □computer program product□ is used to generally refer to removable storage unit 140 or hard disk installed in hard drive 135. These computer program products are means for providing software to computer system 100.

As noted above, computer programs (also called computer control logic) and data representing bicubic surfaces are stored in main memory (RAM 110) and/or secondary storage 130. In the embodiments implemented using software, the software may be stored in a computer program product and loaded into computer system 100 using removable storage drive 137, hard drive 135, or network interface 180. Alternatively, graphics controller 160 (implemented using a combination of hardware, software and/or firmware) may execute the software to provide various features of the present invention.

The control logic (software), when executed by CPU 120 (and/or graphics controller 160) causes CPU 120 (and/or graphics controller 160) to perform the functions of the invention as described herein. In one embodiment, CPU 120 receives the data representing the curved surfaces and instructions, and processes the data to provide various features of the present invention described below. Alternatively, CPU 120 may send control points (described below) to graphics controller 160, which then renders the image.

For simplicity, irrespective of the specific component(s) performing the underlying operation, the operations are described as being performed by computer system 100. The operation and implementation of the components (including software) will be apparent to one skilled in the relevant arts at least based on the description provided below. Several aspects of the present invention are described below with reference to computer system 100 for illustration. The invention permits combining the steps of subdivision and rendering such they are executed together and in real time. The execution of both subdivision and rendering is made possible inside the same graphics controller 160. Alternatively, the subdivision can be executed by the CPU 110 while the rendering is executed by the graphic controller 160.

The steps involved in the combined subdivision and rendering of bicubic surfaces in accordance with the present invention are described below in pseudo code. It should be noted that the present invention applies to both displacement and bump maps. As will be appreciated by one of ordinary skill in the art, the text between the "/*" and "*/" symbols denote comments explaining the pseudo code.

```
Step 0.  /* For each surface, transform only 16 points instead of transforming all the
            vertices inside the surface given a particular view. There is no need to
            transform the normals since they are generated at step 4 */
         For each bicubic surface
              Transform the 16 control points that determine the surface
Step 1.  /* Simplify the three dimensional surface subdivision by reducing it to the
            subdivision of two dimensional curves */
         For each bicubic surface
              Subdivide the boundary curve representing s interval until the projection
              of the height of the curve bounding box is below a certain
              predetermined number of pixels as measured in screen coordinates (SC)
              Subdivide the boundary curve representing t interval until the projection
              of the height of the curve bounding box is below a certain
              predetermined number of pixels as measured in screen coordinates (SC)
         /*Simplify the subdivision termination criteria by expressing it in screen (SC)
         coordinates and by measuring the curvature in pixels. For each new view, a
         new subdivision can be generated, producing automatic level of detail.*/
Step 2
         For all bicubic surfaces sharing a same parameter (either s or t) boundary
              Choose as the common subdivision the reunion of the subdivisions in
              order to prevent cracks showing along the common boundary
              OR
              Choose as the common subdivision the finest subdivision (the one with
              the most points inside the set)
         /* Prevent cracks at the boundary between surfaces by using a common
         subdivision for all surfaces sharing a boundary */
Step 3/* Generate the vertices, normals and the texture coordinates for the present
            subdivision */
         For each bicubic surface
              For each pair (si,tj)
                   Calculate (ui,j v,j qi,j Vi,j)
                   Calculate (mi,j ni,j) coordinates of the bump map
                   Calculate (ki,j li,j) of the displacement map
                   Generate triangles by connecting neighboring vertices
Step 4
              For each vertex Vi,j
                   Calculate the normal Ni,j to that vertex
                   If there is displacement mapping calculate the displaced
                   vertex : Vi,j (x(si,tj),y(si,tj),z(si,tj))+ (dxi,j, dyi,j, dzi,j)*Ni,j
                   If there is bump mapping calculate the displaced normal:
                   N'i,j=Ni,j+dNi,j
              For each triangle
                   Calculate the normal to the triangle
Step 5.
         For each vertex Vi,j
              Calculate lighting
Step 6
         For each triangle
              Clip against the viewing viewport
              Calculate lighting for the vertices produced by clipping
Step 7.
         Project all the vertices Vi,j into screen coordinates (SC)
Step 8
         Render all the triangles produced after clipping and projection
```

Figure 4:
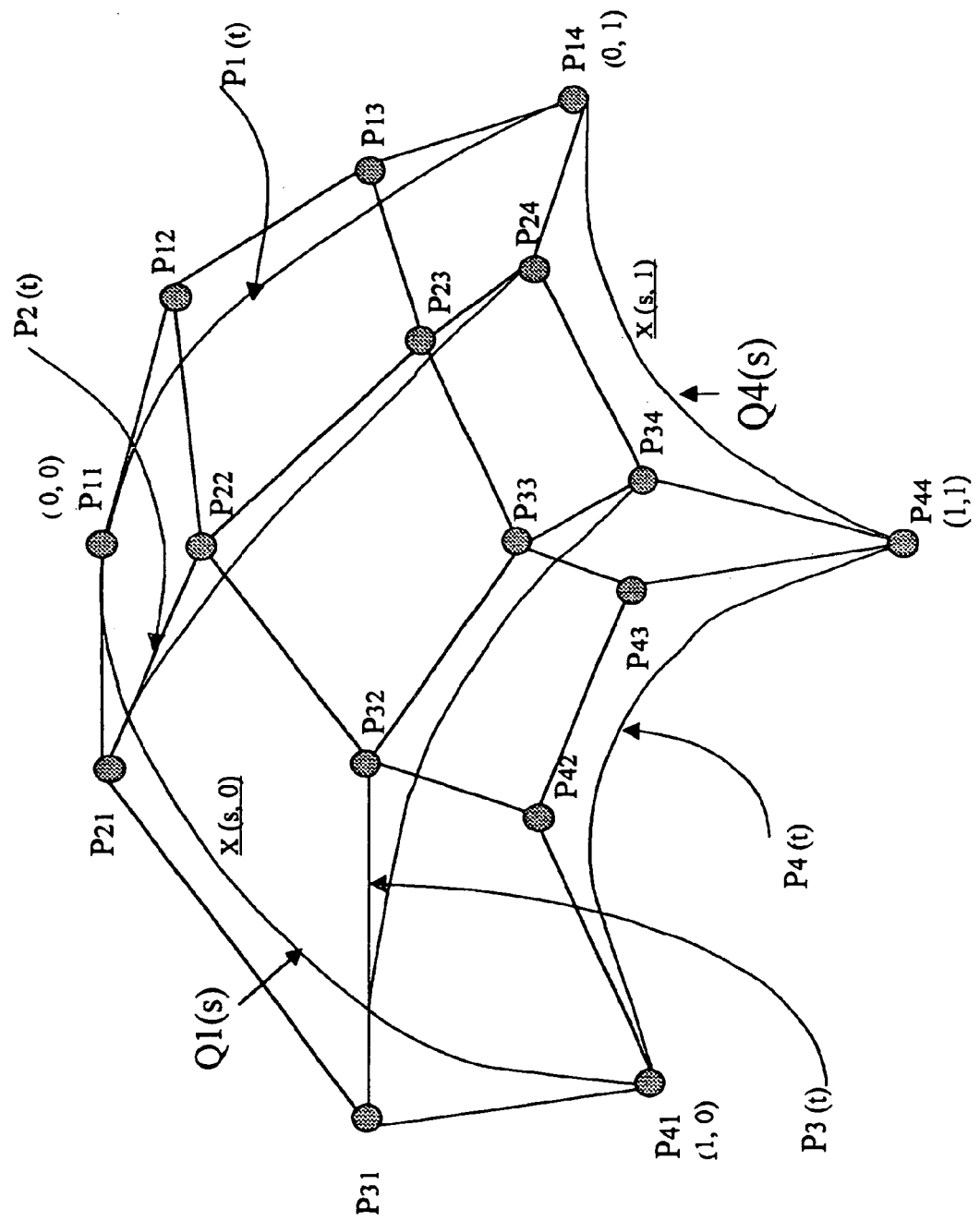
FIG. 4 is a diagram illustrating the theory of Bezier surfaces.

The combined subdivision and rendering process for bicubic surfaces will now be explained in further detail, starting with a description of bezier surfaces. FIG. 4 is a diagram illustrating the theory of Bezier surfaces. Such surfaces are completely determined by 16 control points, P11 through P44. The boundaries of a Bezier surface is defined by four boundary curves, shown in FIG. 4 $P1(t)$, $P4(t)$, $Q1(s)$ and $Q4(s)$, which are all Bezier curves. Each boundary curve is defined by a boundary box formed by the control points that are located above and parallel to the curve. For example, the boundary box for curve $P1(t)$ is formed by line segments drawn between control points P11, P12, P13, and P14. The coordinates of any point on a Bezier surface can be expressed as:

$$x(s, t) = S * Mb * Px * Mb^t * T$$

wherein $S = [s3\ s2\ s1]$ $T = [t3\ t2\ t1]^t$ The superscript $t$ indicates transposition $$Mb = \begin{vmatrix} -1 & +3 & -3 & +1 \\ +3 & -6 & +3 & 0 \\ -3 & +3 & 0 & 0 \\ +1 & 0 & 0 & 0 \end{vmatrix} \quad Mb^t \text{ is the transposed of matrix } Mb$$

$$Px = \begin{vmatrix} P11 & P12 & P13 & P14 \\ P21 & P22 & P23 & P24 \\ P31 & P32 & P34 & P34 \\ P41 & P42 & P43 & P44 \end{vmatrix}_x$$

$$y(s, t) = S * Mb * Py * Mb^t * T$$

where $$Py = \begin{vmatrix} P11 & P12 & P13 & P14 \\ P21 & P22 & P23 & P24 \\ P31 & P32 & P34 & P34 \\ P41 & P42 & P43 & P44 \end{vmatrix}_y$$

$$z(s, t) = S * Mb * Pz * Mb^t * T$$

Figure 1:
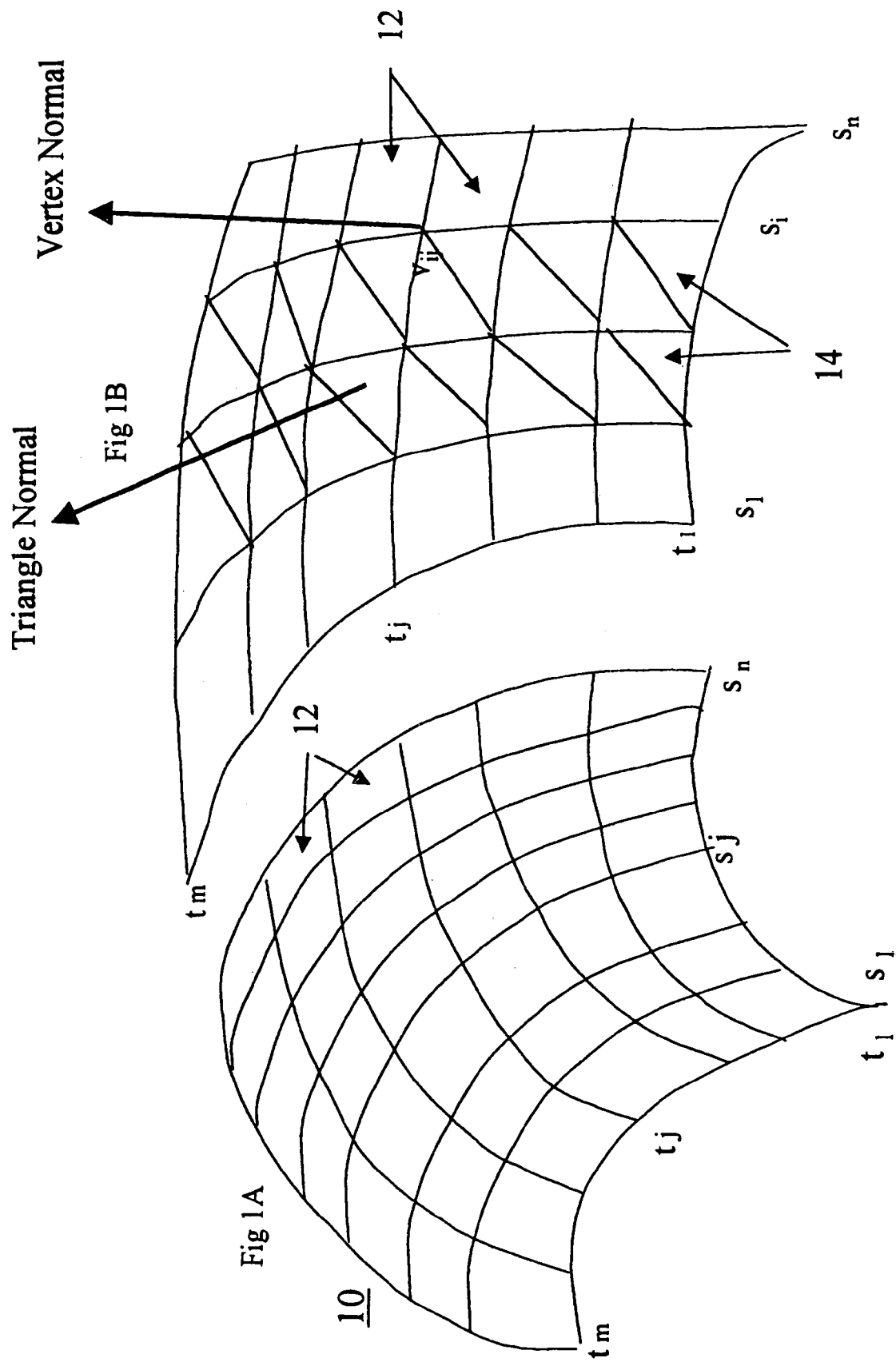
FIGS. 1A and 1B show how bicubic surfaces are subdivided into tiles.
Figure 2:
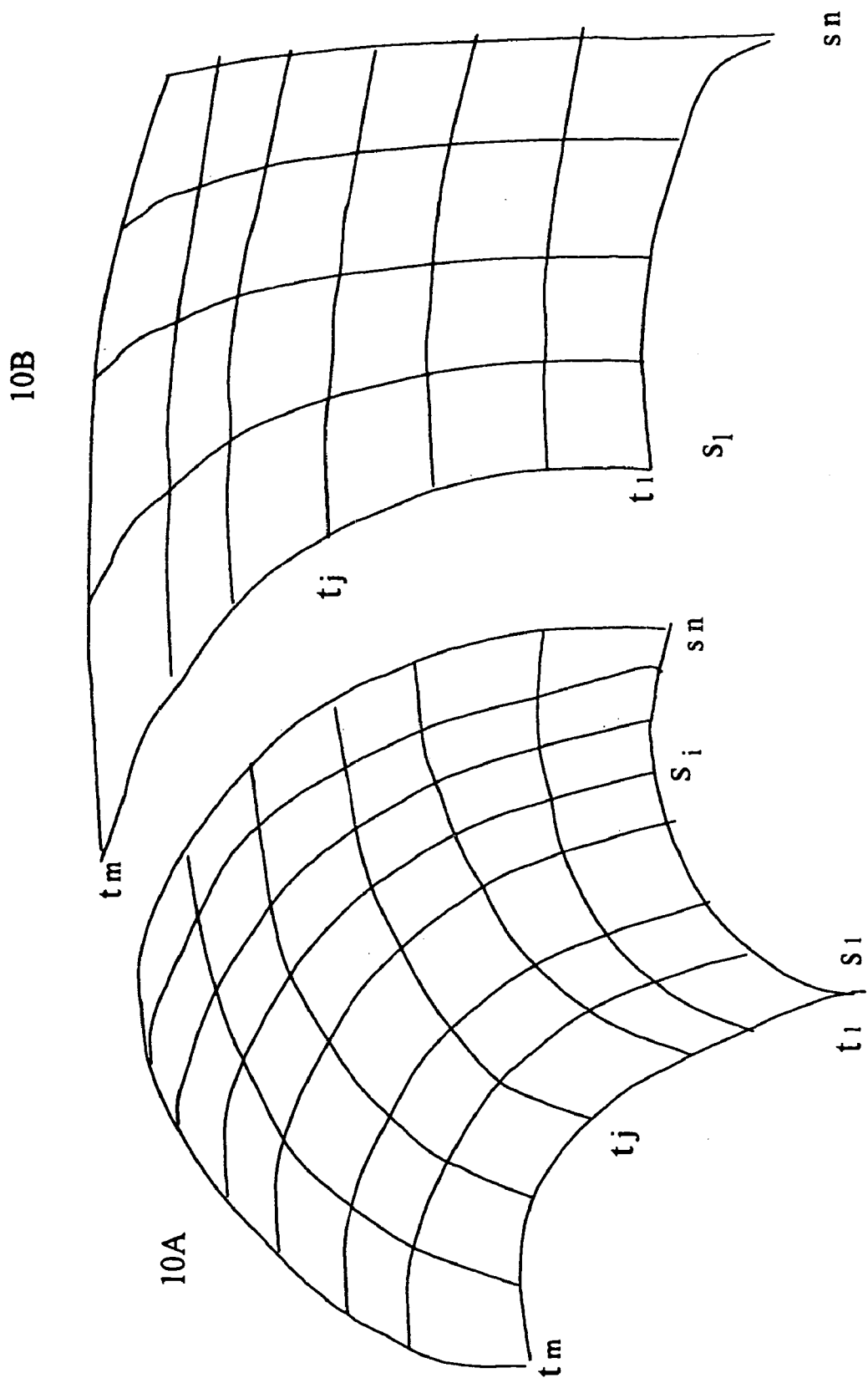
FIG. 2 shows how bicubic surfaces sharing a boundary also share the same subdivision.

When rendering a Bezier surface, the conventional method is to subdivide the surface into smaller four sided tiles, as shown in FIG. 1A, by subdividing the intervals across the entire surface that define the parameters s and t until the subdivision reaches a predetermined threshold.

According to an aspect of the present invention, requiring that only two orthogonal curves of the surface be subdivided minimizes the number of computations required for rendering an object model.

In order to subdivide the surface determined by the sixteen control points P11-P44 we need only to subdivide a pair of orthogonal curves, either the pair {P11, P12, P13, P14} {P14, P24, P34, P44} (i.e. $P1(t)$ and $Q4(s)$) or the pair {P44, P43, P42, P41} {P41, P31, P21, P11}(i.e., $P4(t)$ and $Q1(s)$). It may be observed that one of the curves in the pair is a function only of parameter s while the other is a function only of parameter t. The reason this is true is that the curvature of a bicubic surface is a direct function of the curvature of its boundaries. By controlling the curvature of the boundaries, computer 100 controls the curvature of the surface.

Figure 5:
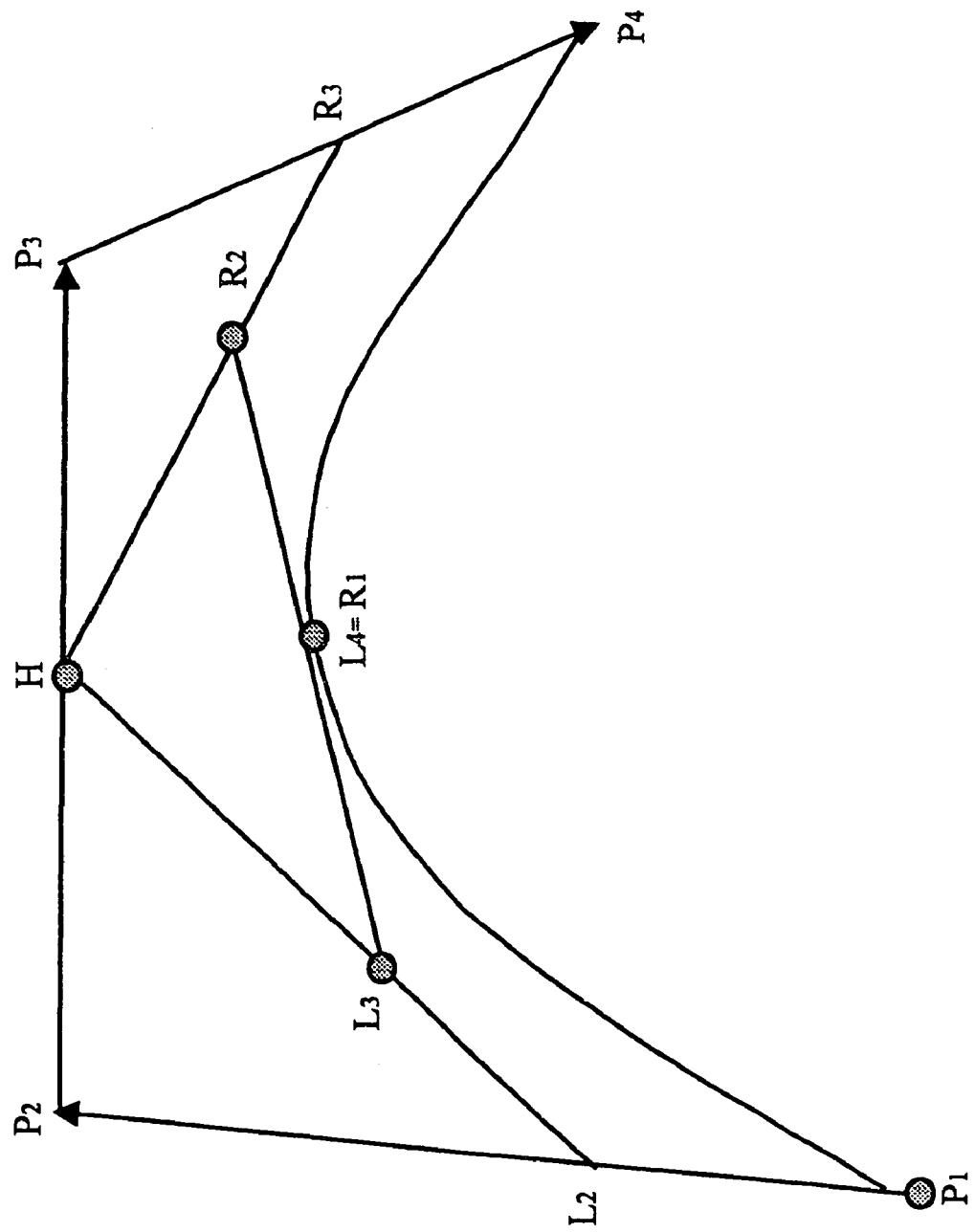
FIG. 5 depicts a graph illustrating an approach by which a Bezier curve may be divided into connected segments of Bezier curves.

FIG. 5 depicts a graph illustrating an approach by which computer system 100 may divide a Bezier curve into connected segments of Bezier curves. The curves formed by the bounding box defining a Bezier curve comprises a plurality of line segments where each segment lies between two control points. The approach uses an iterative process that subdivides the segments that form the bounding box of the curve. At each iteration the Bezier curve is divided into two curve segments, producing two smaller bounding boxes. Each subdivision step halves the parameter interval. The algorithm uses the initial points P1, P2, P3, P4 of the initial boundary box to produce the points:

L1=P1
L2=(P1+P2)/2
H=(P2+P3)/2
L3=(L2+H)/2
R4=P4
R3=(P3+P4)/2
R2=(R3+H)/2
R1=L4=(L3+R2)/2

The geometry vectors of the resulting left and right cubic curve segments may be expressed as follows:

$$GL = \begin{vmatrix} L1 \\ L2 \\ L3 \\ L4 \end{vmatrix} = 1/8 * \begin{vmatrix} 8000 \\ 4400 \\ 2420 \\ 1331 \end{vmatrix}^* \begin{vmatrix} P1 \\ P2 \\ P3 \\ P4 \end{vmatrix} = DL^* G$$

$$\text{where } DL = \begin{vmatrix} 8000 \\ 4400 \\ 2420 \\ 1331 \end{vmatrix}$$

$$G = \begin{vmatrix} P1 \\ P2 \\ P3 \\ P4 \end{vmatrix}$$

$$GR = \begin{vmatrix} R1 \\ R2 \\ R3 \\ R4 \end{vmatrix} = 1/8^* \begin{vmatrix} 1331 \\ 0242 \\ 0044 \\ 0008 \end{vmatrix}^* \begin{vmatrix} P1 \\ P2 \\ P3 \\ P4 \end{vmatrix} = DR^*G$$

$$\text{where } DR = \begin{vmatrix} 1331 \\ 0242 \\ 0044 \\ 0008 \end{vmatrix}$$

Figure 6:
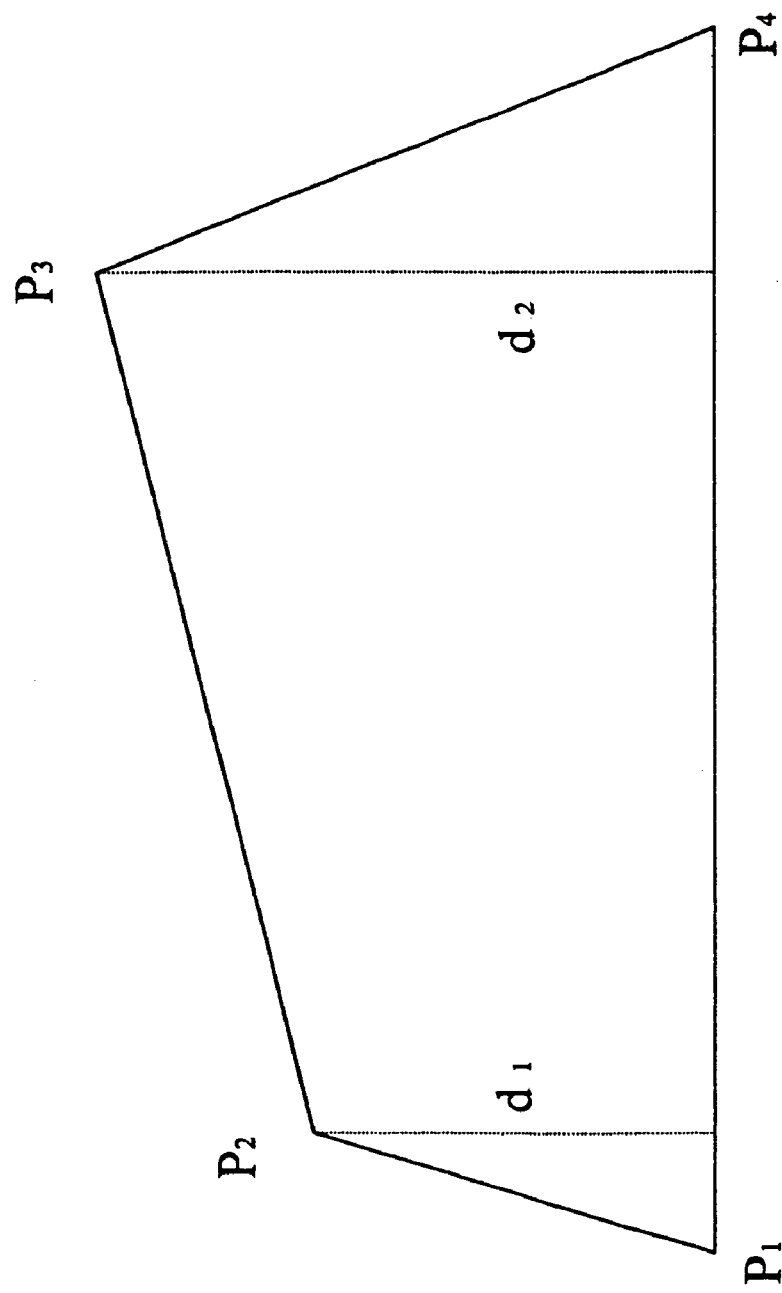
FIG. 6 is a diagram illustrating the criteria of terminating the subdivision (decomposition) of a Bezier curve in the present invention.

FIG. 6 is a diagram illustrating the criteria which computer system 100 may use for terminating the subdivision (decomposition) of the Bezier curve. The subdivision is terminated when a curve reaches a predetermined flatness. After a subdivision, the height of the bounding box in two points is measured. If the maximum height of the bounding box is smaller than a given error term, then a flatness threshold has been met and the curve bounded by the box is no longer subdivided. In one preferred embodiment, SC, computer system 100 is described as expressing the error term to be one pixel.

Max{d1,d2}<1 where d1 and d2 are the distances of P2 respectively P3 to the segment P1, P4

Subdividing only a pair of orthogonal curves, greatly speeds up the subdivision because only two curves need to be subdivided instead of the whole surface, which produces a net of orthogonal curves onto the surface. In addition, only the curves need to be checked for flatness instead of the whole surface, thus the subdivision termination criteria is also simplified.

The manner in which a surface may be subdivided is described in further detail with reference to FIGS. 7-9. Computer system 100 may subdivide two of the boundary Bezier curves, P1($t$) and Q4($s$) for example. Any pair of orthogonal curves may be chosen. The pairs that can be used are: (P1, Q1), (P1, Q4), (P4, Q1) and (P4, Q4). For illustration, it will be assumed that the pair (P1, Q4) is chosen. The curves P1 and Q4 are subdivided according to the approach described above with reference to FIG. 5. Each subdivision step for P1 and Q4 halves the parameter interval for t and s respectively. Three different subdivision termination criteria are illustrated with reference to FIGS. 7-9.

Figure 7:
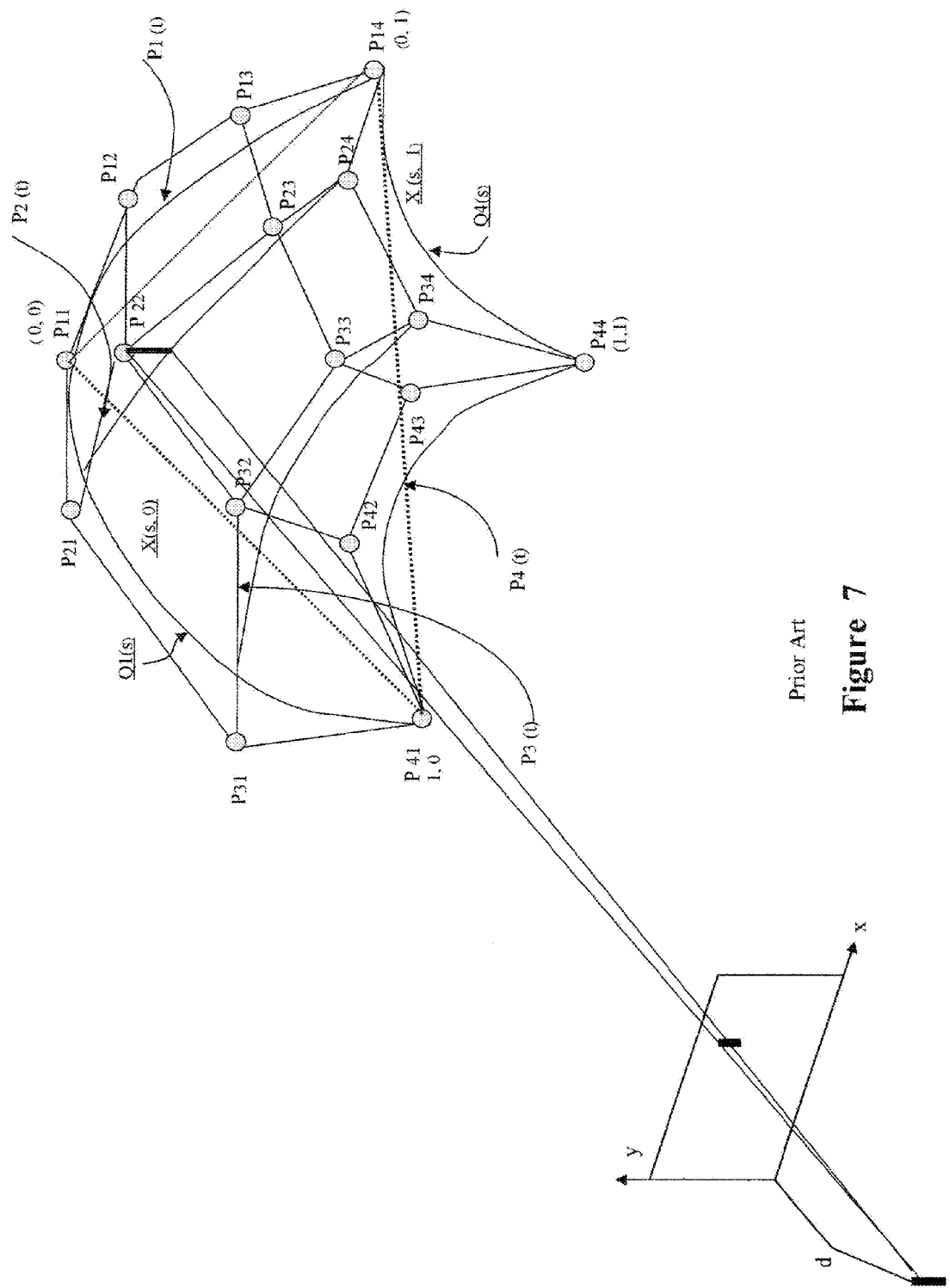
FIG. 7 shows an example of prior art in terms of determining the flatness of the surface.

In FIG. 7 computer system 100 may use the distance from the control point P22 (as is well known these points are referred to as control points because their position determines the position of all the other points on the surface) to the plane determined by points P11, P14, P41 (the termination point of the pair of orthogonal boundary curves) and the distance between the control point P33 to the plane formed by P14, P44, P41 to decide if the surface is within the predetermined criteria of flatness. Each of these distances may be compensated for the distance from the viewer by a projection division by the factors P22$z$/d and P33$z$/d respectively where P22$z$ represents the z component of point P22 and P33$z$ is the z component of P33, d is the distance between the center of projection and the screen. Using this compensation allows for expressing the criteria of subdivision termination in terms of pixels, i.e., in SC. The maximum of the two distances compensated for the distance to the viewer needs to be less than a number of pixels (one in our example).

Computer system 100 could have used the pair of control points (P23, P32), computer system 100 could also use groups of three control points (P22, P23, P33) for example or computer system 100 could have used all four control points (P22, P23, P32, P33). Two control points are sufficient in the described embodiments.

FIG. 7 may be used to compare some aspects of the present invention with some prior art embodiments in terms of determining flatness criteria. The distance from one of the internal control points (P22 in the example) to the plane formed by three other control points (P11, P14, P41) is adjusted for the distance to the viewer by multiplication by the factor d/P22$z$ and the result may need to be less than one pixel. The same condition may need to be satisfied for the control point P33:

distance($P22$ to plane($P11$, $P14$, $P41$))*d/P22$z$<1

AND distance($P33$ to plane($P14$, $P44$, $P41$))*d/P22$z$<1 means the termination of the subdivision. What may make the algorithm slow is the fact that it involves determining the control points P22 and P33 for each iteration. By contrast, an algorithm implemented according to an aspect of the present invention may make use of the control points of two of the boundary curves only.

In FIG. 8 is shown an implementation by using the distances of the control points P12 and P13 to the line segment (P11, P14), the distance of the control points P24 and P34 to the line segment (P14, P44) compensated for distance to the viewer need to be less than a predetermined number of pixels (one, in our case).

Maximum {distance($P12$ to line ($P11$, $P14$), distance ($P13$ to line($P11$, $P14$)}*2d/($P12z+P13z$)<1

AND

Maximum {distance($P24$ to line($P14$, $P44$), distance ($P34$ to line($P14$, $P44$)}*2d/($P24z+P34z$)<1

FIG. 9 shows an implementation of the termination criteria. Computer system 100 projects the control points and the line segments shown in FIG. 7 onto the screen. Computer system 100 then measures the projected distances. If the distances are less than one pixel, the subdivision is terminated. It may be noted that it does not account for the surface curvature of surfaces oriented parallel to the screen.

Let Pij'=projection on the screen of Pij

Then the criteria for subdivision termination is:

Maximum {distance($P12'$ to line ($P11',P14'$), distance ($P13\square$ to line($P11',P14'$)}<1

AND

Maximum {distance($P24'$ to line($P14',P44'$), distance ($P34'$ to line($P14',P44'$)}<1

Figure 10:
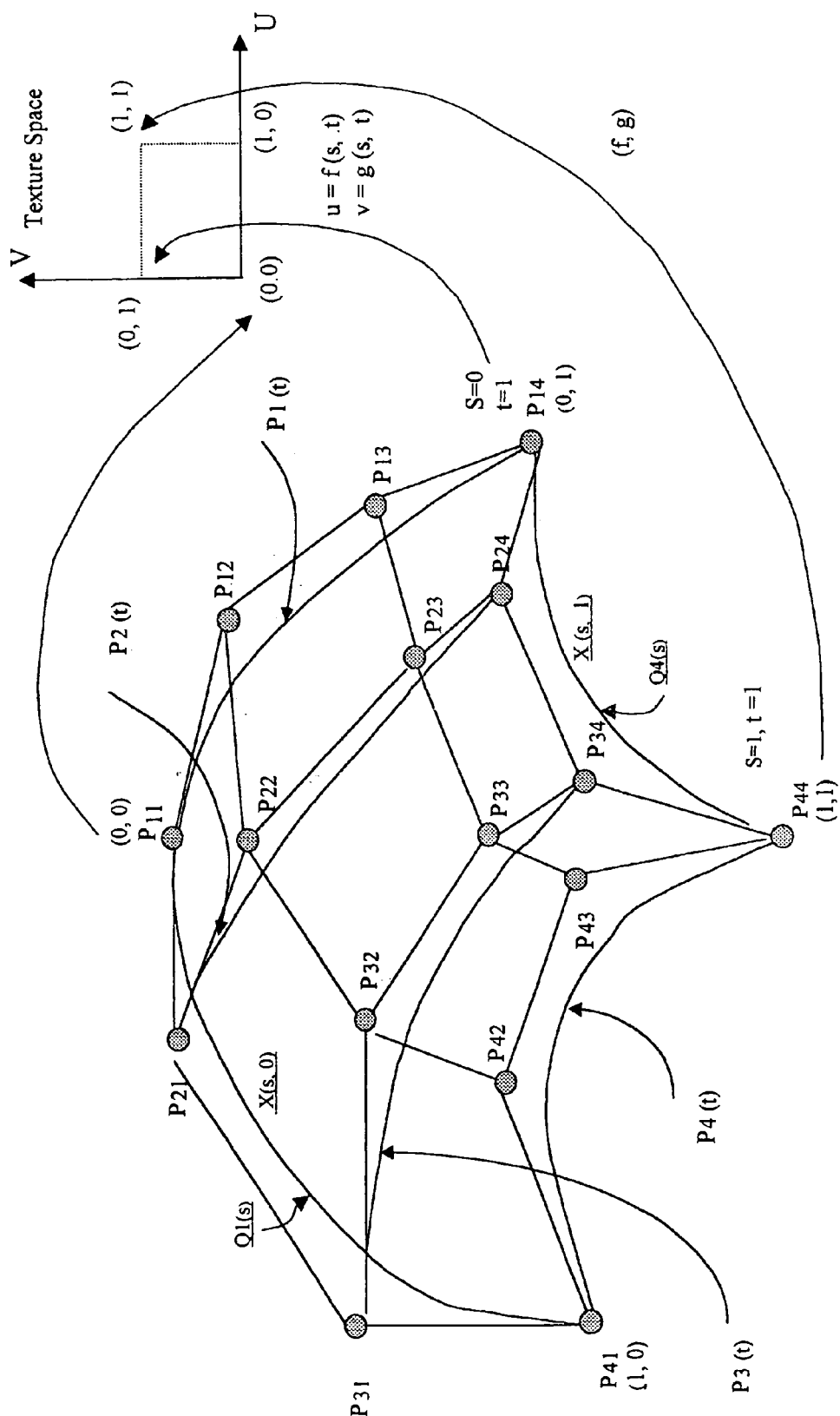
FIG. 10 shows the effect of subdividing the parameter space (s,t) on dividing the texture space (u,v)

FIG. 10 shows the result of the subdivision. The Bezier surface is approximated by two triangles (P11, P14, P44) and (P44, P41, P11). The normal in any vertex can be calculated as the cross-product of the oriented edges that stem from the vertex.

Figure 11:
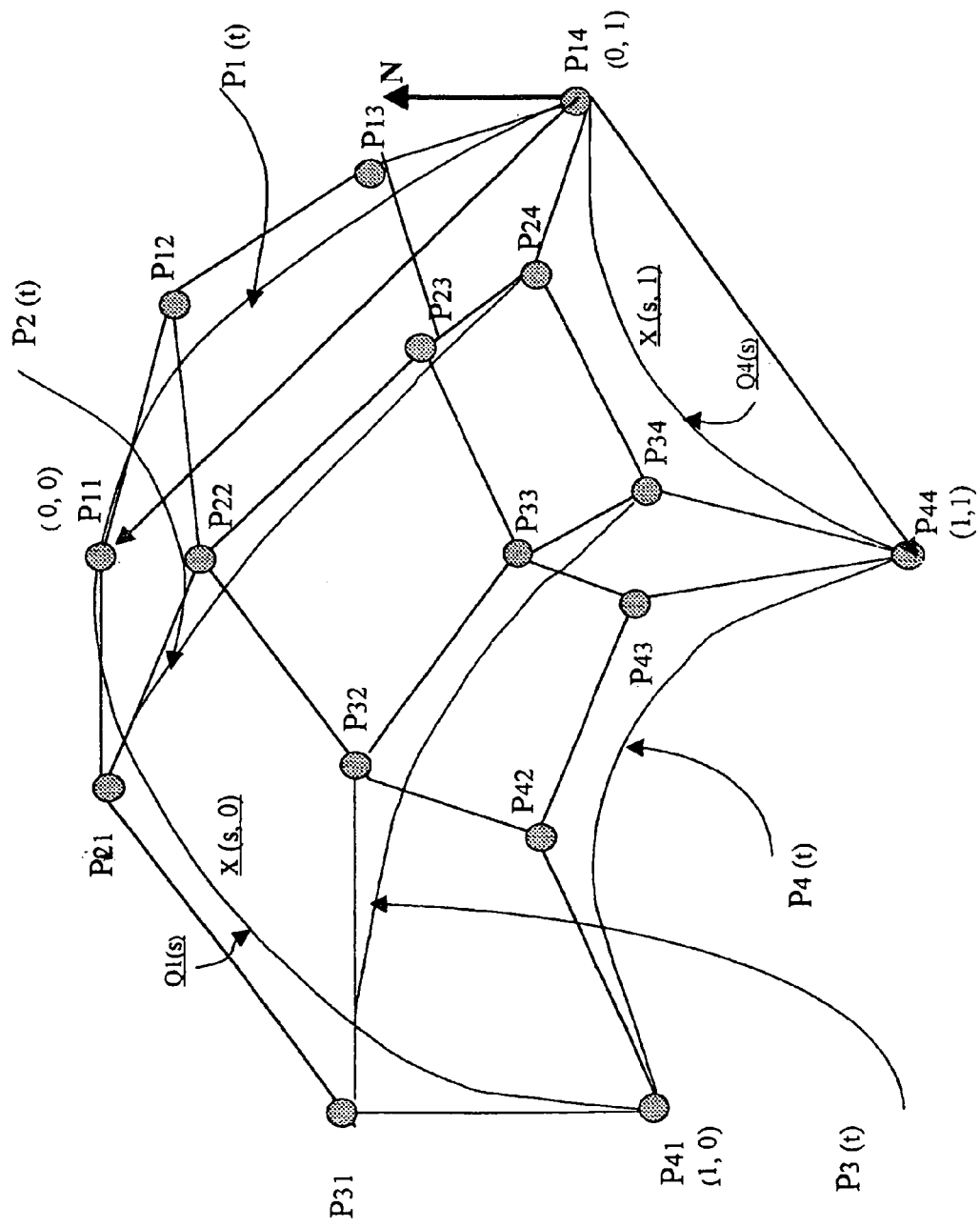
FIG. 11 shows the calculation of the normal N to the vertex as the cross product of the vectors that start in the vertex and connect it with the neighboring vertices.

FIG. 11 shows the effect of subdividing the parameter space (s,t) on dividing the texture space (u,v). For each pair of pair of parameters (s,t) that results from the subdivision, a new pair of parameters (u,v) is obtained by evaluating the functions that express u and v as functions of s and t.

FIG. 11 also shows the calculation of the normal N to the vertex P14. The normal vector N is equal to:

$N$=(vector($P14P11$)×vector($P14P24$))/length(vector ($P14P11$)×vector($P14P24$))

B-Spline surfaces can be passed through the same algorithm by knowing that any B-spline curve can be represented as a Bezier curve through a basis change (change of representation). NURBS surfaces (non uniform rational B-splines) or any other form of rational bicubic surface can be subdivided by making use of the existing algorithms for subdividing NURB curves. This algorithm uses a recursive approach in determining the new control points for the bounding boxes by inserting new values named "knots" into the parameter interval. A complete description can be found in "Mathematical Elements for Computer Graphics" By D. F. Rogers, which is incorporated in its entirety into the present application.

Most objects are created from abutting multiple surfaces creating a so-called surface mesh. The subdivision algorithm must produce the same number of steps for each surface in the mesh, otherwise cracks will appear along the boundaries between surfaces. In order to achieve that the proposed algorithm does a pass over all the surfaces, it finds the surface that needs the most number of subdivision steps in parameter t, it finds the surface that needs the most number of subdivision steps in parameter s and it uses these two subdivisions for all the surfaces in the mesh. An alternative approach, more exact but slower is to form the subdivision of the mesh as the reunion of the subdivisions of the patches that compose the mesh.

Thus, the present invention provides a method and apparatus for rapid subdivision of any type of mesh of bicubic surfaces. The approaches rely on subdividing only two of the four boundary cubic curves. The criteria of stopping the subdivision is expressed only in screen coordinates (SC). Only the control points of the resulting cubic curves need to be calculated. The approach produces the texture coordinates associated with the corners of the resulting surfaces. The approach also produces the surface normals needed for lighting calculations. The normals are computed in real time by calculating the gradient to the surface. As opposed to the current state of the art, the normals are already in the proper orientation, they do not need to be subjected to coordinate transformation. This is a major departure from the current state of the art because it saves normal transformation computation and because it is directly applicable to deformable surfaces. By their very own structure, deformable surfaces have variable normals that need to be recomputed in real time. The approach may be used to ensure that the surfaces belonging to any mesh or collection of meshes are subdivided in such a way that there are no cracks at the boundaries of any two abutting surfaces.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for rendering bicubic surfaces of an object on a computer system, at least one of the surfaces is defined by sixteen control points and bounded by four boundary curves, wherein each boundary curves is formed by boundary box of line segments formed between four control points, the method comprising:
   (a) transforming only the control points of the surface given a view of the object;
   (b) selecting a pair of orthogonal boundary curves to process;
   (c) iteratively subdividing only the pair of orthogonal boundary curves, wherein two new curves are generated with each subdivision;
   (d) terminating the subdivision of each of the curves when the curves satisfy a flatness threshold expressed in screen coordinates, thereby minimizing a number of computations required to render the object; and
   (e) storing the rendered object in a memory.

2. The method of claim 1 further including the step of performing a new subdivision on each of the two orthogonal curves for each new view.

3. The method of claim 2 further including the steps of:
   iteratively subdividing the segments forming the boundary box of each of the selected boundary curves, creating two new boundary boxes and corresponding curves; and
   terminating the subdivision when a maximum height of both the new boundary boxes reaches a predetermined threshold measured in screen coordinates.

4. The method of claim 3 further including the step of expressing the predetermined threshold as one pixel.

5. The method of claim 4 further including the step of representing the subdivision termination in screen coordinates by compensating the maximum height of the boundary box from a distance from a viewer by a projection plane division.

6. The method of claim 5 further including the step of projecting control points and the line segments comprising the boundary box defining one of the curves onto a display screen.

7. The method of claim 6 further including the step of measuring the projected distances to determine if the threshold is reached.

8. The method of claim 4 further including the step of performing the subdivision in hardware.

9. The method of claim 4 further including the step of performing the subdivision in software.

10. The method of claim 4 further including the step of performing the subdivision using a combination of hardware and software.

11. The method of claim 4 further including the step of rendering the object by generating vertices, normals and texture coordinates for the subdivision in real time, such that a new set is generated for each surface orientation.

12. The method of claim 11 further including the step of performing the subdivision and the rendering in real-time.

13. The method of claim 4 further including the step of rendering the object by generating perturbed vertices through displacement mapping.

14. The method of claim 13 further including the step of performing the subdivision and the rendering in real-time.

15. The method of claim 4 further including the step of rendering the object by generating perturbed normals through bump mapping.

16. The method of claim 15 further including the step of performing the subdivision and the rendering in real-time.

17. The method of claim 11 further including the step of generating the triangles by connecting neighboring vertices.

18. The method of claim 17 further including the steps of calculating the normal $N_{i,j}$ to each vertex $V_{i,j}$ and, calculating the normal to each triangle.

19. The method of claim 18 further including the step of calculating lighting for each vertex $V_{i,j}$.

20. The method of claim 19 further including the steps of clipping each triangle against a viewing viewport; and calculating lighting for the vertices produced by the clipping.

21. The method of claim 20 further including the step of projecting all the vertices $V_{i,j}$ into screen coordinates (SC).

22. The method of claim 21 further including the step of rendering all the triangles produced after clipping and projection.

23. A computer readable medium containing program instructions for rendering bicubic surfaces of an object on a computer system, at least one of the surface is defined by sixteen control points and bounded by four boundary curves, wherein each boundary curves is formed by boundary box of line segments formed between four control points, the program instructions for:
   (a) transforming only the control points of the surface given a view of the object;
   (b) selecting a pair of orthogonal boundary curves to process;
   (c) iteratively subdividing only the pair of orthogonal boundary curves, wherein two new curves are generated with each subdivision;
   (d) terminating the subdivision of each of the curves when the curves satisfy a flatness threshold expressed in screen coordinates, thereby minimizing a number of computations required to render the object; and
   (e) storing the rendered object in a memory.

24. The computer readable medium of claim 23 further including the instruction of performing a new subdivision on each of the two orthogonal curves for each new view.

25. The computer readable medium of claim 24 further including the instructions of:
   iteratively subdividing the segments forming the boundary box of each of the selected boundary curves, creating two new boundary boxes and corresponding curves; and
   terminating the subdivision when a maximum height of one of the new boundary boxes reaches a predetermined threshold measured in screen coordinates.

26. The computer readable medium of claim 25 further including the instruction of expressing the predetermined threshold as one pixel.

27. The computer readable medium of claim 26 further including the instruction of representing the subdivision termination in screen coordinates by compensating the maximum height of the boundary box from a distance from a viewer by a projection plane division.

28. The computer readable medium of claim 27 further including the instruction of projecting control points and the line segments comprising the boundary box defining one of the curves onto a display screen.

29. The computer readable medium of claim 28 further including the instruction of measuring the projected distances to determine if the threshold is reached.

30. The computer readable medium of claim 26 further including the instruction of performing the subdivision in hardware.

31. The computer readable medium of claim 26 further including the instruction of performing the subdivision in software.

32. The computer readable medium of claim 26 further including the instruction of performing the subdivision using a combination of hardware and software.

33. The computer readable medium of claim 26 further including the instruction of rendering the object by generating vertices, normals and texture coordinates for the subdivision.

34. The computer readable medium of claim 33 further including the instruction of performing the subdivision and the rendering in real-time.

35. The computer readable medium of claim 33 further including the instruction of generating the triangles by connecting neighboring vertices.

36. The computer readable medium of claim 35 further including the instructions of calculating the normal $N_{i,j}$ to each vertex $V_{i,j}$ and, calculating the normal to each triangle.

37. The computer readable medium of claim 36 further including the instruction of calculating lighting for each vertex $V_{i,j}$.

38. The computer readable medium of claim 37 further including the instructions of clipping each triangle against a viewing viewport; and calculating lighting for the vertices produced by the clipping.

39. The computer readable medium of claim 38 further including the instruction of projecting all the vertices $V_{i,j}$ into screen coordinates (SC).

40. The computer readable medium of claim 39 further including the instruction of rendering all the triangles produced after clipping and projection.

41. A computer system for rendering curved surfaces of an object, comprising:
   a communication path;
   a random access memory (RAM) coupled to the communication path containing program instructions for defining a curved surface of an object and instructions for rendering the object, wherein the curved surface is defined by sixteen control points and bounded by four boundary curves, wherein each boundary curves is formed by boundary box of line segments formed between four control points;
   at least one processor coupled to the communication path;
   a graphics controller coupled to the communication path for receiving commands from the processor and generating display signals therefrom; and
   a display unit coupled to the graphics controller for displaying images defined by the display signals,
   wherein when the program instructions are executed, the program instructions render the curved surfaces of the object by,
      transforming only the control points of the surface given a view of the object,
      selecting a pair of orthogonal boundary curves to process,
      iteratively subdividing only the pair of orthogonal boundary curves, wherein two new curves are generated with each subdivision, and
      terminating the subdivision of each of the curves when the curves satisfy a flatness threshold in screen coordinates, thereby minimizing a number of computations required to render the object.

42. The computer system of claim 41 wherein the instructions for subdivision and rendering are executed in real time.

43. The computer system of claim 42 wherein the instructions are stored in the RAM.

44. The computer system of claim 42 wherein the instructions are retrieved from a network interface.

45. The computer system of claim 42 wherein the instructions are executed by the processor.

46. The computer system of claim 42 wherein the instructions are executed by the graphics controller.

47. The computer system of claim 42 wherein the instructions for subdivision are executed by the processor and the instructions for rendering are executed by the graphics controller.

48. The computer system of claim 42 wherein the graphics controller is implemented as hardware.

49. The computer system of claim 42 wherein the graphics controller is implemented as software.

50. The computer system of claim 42 wherein the graphics controller is implemented as a combination of hardware and software.

* * * * *